United States Patent [19]

Rinker et al.

[11] Patent Number: 5,782,957
[45] Date of Patent: *Jul. 21, 1998

[54] PROCESS FOR TREATING IRON BEARING MATERIAL

[75] Inventors: Franklin G. Rinker, Perrysburg; Deane A. Horne, Toledo, both of Ohio

[73] Assignee: Maumee Research & Engineering, Inc., Northwood, Ohio

[*] Notice: The term of this patent shall not extend beyond the expiration date of Pat. No. 5,601,631.

[21] Appl. No.: 746,203

[22] Filed: Nov. 6, 1996

Related U.S. Application Data

[63] Continuation-in-part of Ser. No. 519,844, Aug. 25, 1995, Pat. No. 5,601,631.

[51] Int. Cl.$^6$ .............................. C21B 13/00; C21B 13/14
[52] U.S. Cl. ..................... 75/436; 75/444; 75/446; 75/475; 75/479; 75/484; 75/488; 75/504; 75/567; 75/656; 75/668; 75/695; 75/961
[58] Field of Search .................. 75/484, 436, 444, 75/446, 475, 479, 488, 504, 567, 656, 668, 695

[56] References Cited

U.S. PATENT DOCUMENTS

| | | | |
|---|---|---|---|
| 2,793,109 | 5/1957 | Huebler et al. | 75/3 |
| 3,378,242 | 4/1968 | Cone et al. | 263/7 |
| 3,452,972 | 7/1969 | Beggs | 266/20 |
| 3,836,353 | 9/1974 | Holley | 75/3 |
| 4,251,267 | 2/1981 | Beggs et al. | 75/35 |
| 4,701,214 | 10/1987 | Kaneko et al. | 75/38 |
| 4,836,847 | 6/1989 | Bishop et al. | 75/25 |
| 4,917,723 | 4/1990 | Coyne, Jr. | 75/433 |
| 5,186,741 | 2/1993 | Kotraba et al. | 75/484 |
| 5,601,631 | 2/1997 | Rinker et al. | 75/484 |

*Primary Examiner*—Melvyn Andrews
*Attorney, Agent, or Firm*—Brinks Hofer Gilson & Lione

[57] ABSTRACT

A process for treating iron-bearing material with a carbonaceous material to form a dry mixture, wherein the amount of carbonaceous material added exceeds the stoichiometric amount required to reduce the metal oxide to elemental metal. In one embodiment, the process also includes blending an organic binder with the dry mixture. The dry mixture is agglomerated to bond the dry mixture and form green compacts. The green compacts are loaded into a heated furnace and heated for about 5–12 minutes at a temperature of between about 2100°–2500° F. to reduce the iron oxide containing compacts to compacts containing elemental iron and an excess amount of carbonaceous material wherein the excess amount of carbonaceous material counteracts re-oxidation of the elemental iron. The reduced compacts are then discharged from the furnace.

26 Claims, 2 Drawing Sheets ized and too fine for iron making processes using
5,782,957

PROCESS FOR TREATING IRON BEARING MATERIAL

CROSS-REFERENCE TO RELATED PATENT APPLICATION

This application is a continuation-in-part of application Ser. No. 08/519,844, filed Aug. 25, 1995, now U.S. Pat. No. 5,601,631 the disclosure of which is incorporated herein by reference.

FIELD OF THE INVENTION

This invention relates to a process for treating iron-bearing material. More particularly, this invention relates to a process for treating iron-bearing material including virgin iron oxide concentrates and natural iron ore fines and the like and mixtures thereof to reduce most of the iron oxides to elemental iron.

BACKGROUND OF THE INVENTION

Direct reduction of iron oxide containing ore in fine, lump and pellet form is well known in the metallurgical literature. In general, such processes have evolved for the purpose of directly reducing the iron oxide containing ore in a solid-state form to form elemental iron, commonly known as direct reduced iron, or "DRI." DRI may be used as substitute for steel scrap. Recent increases in steel scrap prices are indicative of future trends which is a result of the continuing decline in availability of top grades of steel scrap. Accordingly, DRI is being viewed as a reasonably priced substitute for basic iron units. DRI is easily melted in an electric arc furnace or blast furnace to produce high quality steel, having a low percentage of residual elements or gangue. By using DRI as a complement to the furnace charge, DRI compensates for the negative effects of certain types of low grade steel scrap.

An added advantage of DRI in steel making processes is that coke may be replaced by less costly coal to supply carbon for fuel and to serve as a chemical reductant in converting the iron ore into elemental iron to form DRI.

The preparation of elemental iron from iron-bearing material such as iron-bearing ores has presented many difficulties. Generally, natural ore fines are too coarse for pelletization and too fine for iron making processes using conventional technology. For a more detailed discussion of various known processes and apparatus for metal oxide recovery reference is made to U.S. Pat. Nos. 5,186,741; 4,701,214; 4,251,267; 3,452,972 and 2,793,109 all of which are hereby fully incorporated by reference.

The present invention is directed to a process for treating iron-bearing material. As used herein, the term "iron-bearing material" specifically refers to virgin, i.e., untreated or unprocessed, iron oxide concentrates and natural iron ore fines such as hematite, limonite, magnetite, taconite, siderite, pyrites and chromite as opposed to steel mill waste, electric arc furnace dust, rolling mill scale, or the like, collected as a result of normal steel making operations.

It will be appreciated that there is a significant need for an improved process for refining iron-bearing material to elemental iron. An object of the present invention is to provide a process for agglomerating a dry mixture of iron-bearing material and a carbonaceous material to form green compacts for refinement of iron from the iron-bearing materials. The formation of compacts may be accomplished using an organic binder if the carbonaceous material contains less than about 20 wt % volatile matter or they may be formed without an organic binder if the carbonaceous material contains more than about 20 wt % volatile matter. Yet another object of the present invention is to provide a process for refining iron-bearing material to convert iron-bearing material to iron that is simple and economical. The economic advantage may be manifested in reduced transportation costs and reduced melting costs at the point of steel making.

SUMMARY OF THE INVENTION

Briefly, according to this invention there is provided a process for treating iron-bearing material. The process according to the invention involves the steps of providing an iron-bearing material and a carbonaceous material containing less than about 8 wt % moisture and combining the iron-bearing material with a carbonaceous material to form a dry mixture, wherein the amount of carbonaceous material added exceeds the stoichiometric amount required to reduce the iron oxide to elemental iron. The reduced compacts contain substantially all of the elemental iron introduced with the iron-bearing material and a substantial portion of the iron oxide is reduced to the elemental metal state. The dry mixture is then agglomerated to bond the dry mixture and form green compacts. The green compacts are then loaded into a heated furnace to heat the green compacts for about 5–25 minutes at a temperature of between about 2100°–2500° F. to reduce the iron oxide containing compacts to compacts containing elemental iron and an excess amount of carbonaceous material wherein the excess amount of carbonaceous material counteracts re-oxidation of the elemental iron. The reduced iron-bearing compacts are then discharged from the furnace. The iron-bearing material and the carbonaceous material are dried in a dryer.

DESCRIPTION OF THE DRAWINGS

Further features and other objects and advantages of this invention will become clear from the following detailed description made with reference to the drawings in which.

DETAILED DESCRIPTION OF THE PREFERRED EMBODIMENTS

Figure 1:
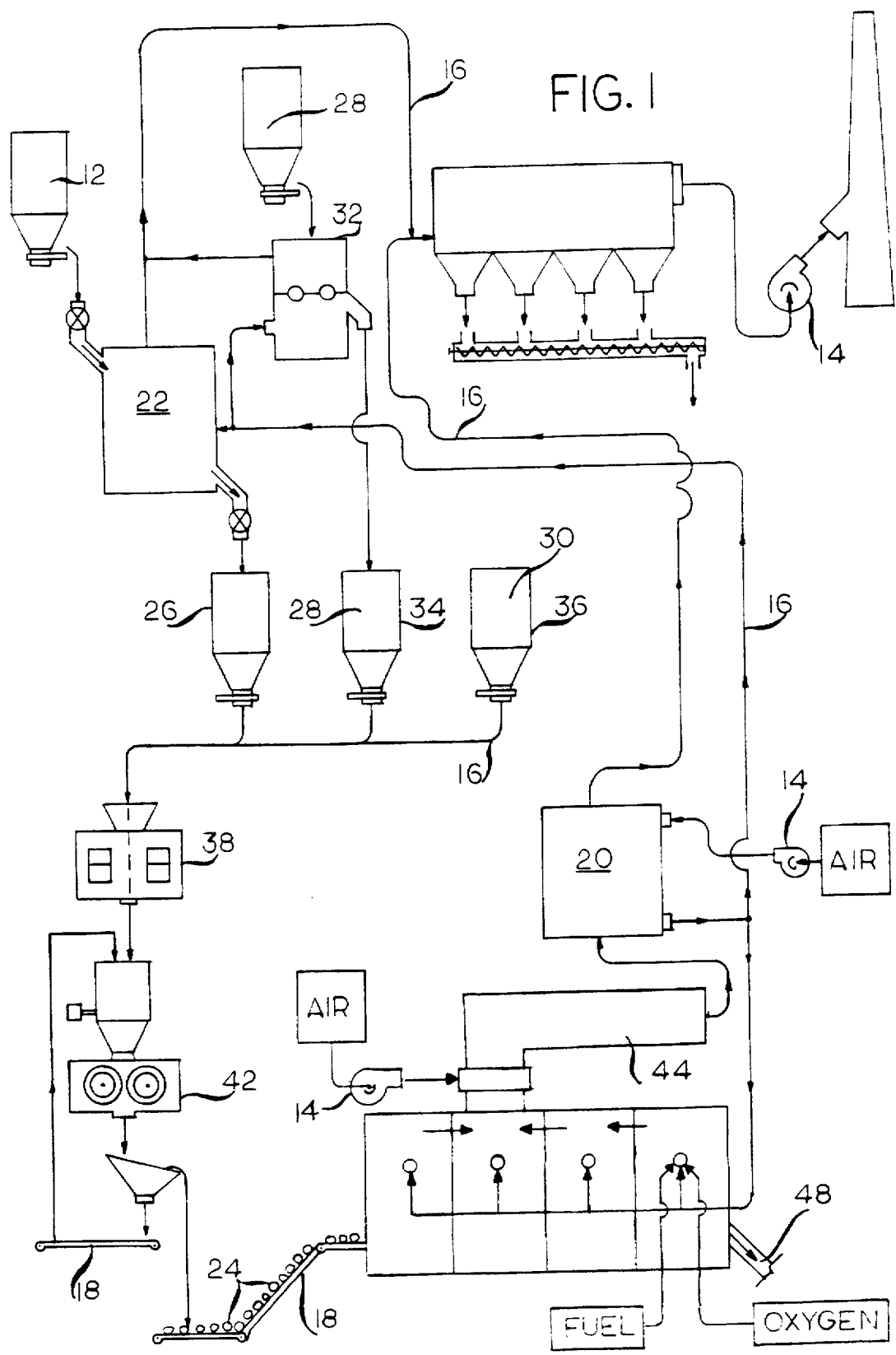
FIG. 1 is a schematic illustrating a process in accordance with the present invention employed for treating iron-bearing material.

Referring to the figures, wherein like reference characters represent like elements, there is shown in the figures various aspects of a process for treating iron-bearing material 12. The present invention is specifically directed to treating iron-bearing material 12 as opposed to waste material which is a natural byproduct of steel making and other metallurgical processes. Consequently, as used herein, the term "iron-bearing material" specifically refers to virgin, i.e., thermally untreated or unprocessed, iron oxide concentrates and natural iron ore fines such as hematite, limonite, magnetite, taconite, siderite, pyrites and chromite and the like and mixtures thereof.

It should be noted that for purposes of clarity certain details of construction of the apparatus for practicing the process of treating iron-bearing material 12 are not provided in view of such details being conventional and well within the skill of the art once the invention is disclosed and explained. For example, blowers 14, piping 16, conveyors 18, heat exchangers 20 and the like as required for the handling of gaseous and particulate solid materials may be any such known commercially available components with the exception that such components may be modified as necessary by one skilled in the art to be employed in the overall system of the present invention as discussed herein. Reference is made to the Chemical Engineer's Handbook, 6th Edition, McGraw Hill, New York 1984; Kelly, E., G., Introduction To Mineral Processing, John Wiley & Sons, Inc., 1982, and to the chemical engineering industry literature generally for detailed descriptions of the various apparatus and processing structure and conditions.

As shown in FIG. 1, iron-bearing material 12 is fed to a dryer 22. In a preferred embodiment, the iron-bearing material is of a size up to about minus 60 mesh, although it is believed that iron-bearing material of a size up to about minus 20 mesh will also work. The iron-bearing material 12 is dried to less than about 8 wt % moisture, preferably less than about 3 wt % moisture at a temperature of about 150°–450° F. The iron-bearing material 12 is dried to remove moisture from the material, improve thermal efficiency and improve compaction of the compacts 24 as further described herein. The dryer 22 may be of a type well known in the art such as a rotary kiln or fluidized bed. As shown in the figure, Exhaust air from the dryer is exhausted from the dryer 22 and conveyed through piping 16 to a baghouse 30 of a type well known in the art to capture sensible heat and improve the efficiency of the overall process.

The dry iron-bearing material 12 is then conveyed to a feeder bin 26 for subsequent mixing with carbonaceous material 28.

The carbonaceous material 28 used in the process of the present invention may be most any suitable material rich in fixed carbon. In a preferred embodiment, the carbonaceous material 28 is a coal such as a sub-bituminous coal high in fixed carbon and having more than about 20 wt % volatile matter. The volatile matter includes tarry hydrocarbons typically described as bitumen having solid or semi-solid hydrocarbons such as asphaltenes, carbenes, kerotenes and the like. The carbonaceous material 28 may also be a coal material upgraded by a liquid from coal process as described in U.S. patent application Ser. No. 08/565,851, entitled Process For Treating Noncaking Coal To Form Passivated Char, incorporated herein by reference. It will be appreciated that the process of the present invention may also be performed with a carbonaceous material 28 containing less than about 20 wt % volatile matter by adding an organic binder 30 of a type well known in the art as further described herein to function as a binder to form the compacts 24 instead of or in cooperation with the volatile matter from the carbonaceous material.

The carbonaceous material 28 is reduced in size and then dried to less than about 8 wt %, preferably less than about 3 wt % moisture. The carbonaceous material 28 is reduced in size in a crusher 32 of a type well known in the art to provide carbonaceous material of a suitable particle size for blending with the iron-bearing material 12. The carbonaceous material 28 is reduced to a size as large as about minus 60 mesh and dried by preheating to a temperature of about 150°–450° F. The carbonaceous material 12 is dried to remove moisture from the material, improve thermal efficiency, improve compaction of the compacts 24 and depending upon the amount of volatile matter present, reduce or eliminate the amount of organic binder 30 required. The dried carbonaceous material 12 is then pneumatically transported for storage to the feeder bin 34.

The optional organic binder 30 is stored in bin or tank 36. The organic binder 30 may be selected from any type of organic binder well known in the art. For example, the organic binder 30 may be molasses, coal tar pitch, humic acid and the like. The requirement of the addition of organic binder 30 to the mixture is a function of the amount of carbon and volatile matter in the carbonaceous material 28. For example, a carbonaceous material 28 containing less than about 20 wt % volatile matter requires the addition of an organic binder 30 to suitably agglomerate the mixture. It will be appreciated that the organic binder also serves as a source of carbon for the reaction.

The organic binder 30 may also include a lime material to counteract subsequent re-oxidation of the elemental iron as further described herein. In addition, the lime forms a bond with and enhances the physical qualities of the final product pertaining to anti-dusting and the like. Suitable lime containing materials include limestone, dolomite, calcined lime and burnt dolomite and the like.

The iron-bearing material 12, carbonaceous material 28 and, optional organic binder 30, are metered from the storage bins 26, 34, 36 and thoroughly blended to form a dry mixture in a mixer 38 of a type well known in the art. In a preferred embodiment, the iron-bearing material 12, carbonaceous material 28 and, optional organic binder 30, are thoroughly blended in a mixer such as a Mix-Muller mixer from Simpson Technologies Corporation. As used herein the term "dry mixture" refers to a mixture formed without the addition of water and containing less than about 2 wt % water. The carbonaceous material 28 is provided to the mixer 38 in an amount above the stoichiometric amount required to reduce the iron-oxide to elemental iron thereby ensuring that there is also sufficient carbon present to protect the subsequently reduced elemental iron from the oxidizing environment within the furnace 40.

The blended dry mixture of iron-bearing material 12, carbonaceous material 28 and, optional organic binder 30, is then agglomerated in a briquetting press 42 to form green compacts 24. It will be appreciated that typical iron oxide concentrates and natural ore fines are typically too coarse for conventional pelletization. However, in accordance with the present invention, iron oxide concentrates and natural ore fines as large as minus 60 mesh, and perhaps as large as minus 20 mesh, may be used in forming briquettes. A dry mixture containing a carbonaceous material 28 having more than about 20 wt % volatile matter is agglomerated under conditions sufficient to mobilize volatile matter from the carbonaceous material to function as a binder for the compacts 24. Similarly, a dry mixture containing a carbonaceous material 28 having less than about 20 wt % volatile matter is agglomerated with the organic binder 30 to function as a binder for the compacts 24.

Depending upon the content level of the volatile matter in the carbonaceous material 28, e.g. bituminous coal, either high pressure or the combined effects of high pressure and a high temperature preheat of the carbonaceous material may be required to mobilize volatile matter from the carbonaceous material. For example, in accordance with the present invention, a carbonaceous material 28 containing at least 30 wt % volatile matter only requires application of high pressure to mobilize volatile matter and a carbonaceous material containing between about 20–30 wt % volatile matter requires application of both high temperature preheat of the iron-bearing material 12 and high pressure to mobilize volatile matter for use as a binder during agglomeration.

As used herein, the term "high pressure" refers to a pressure greater than about 10,000 pounds per square inch and the term "high temperature preheat" refers to a temperature greater than about 400° F.

The green compacts 24 formed in the briquetting press 42 are then screened to obtain compacts of a uniform size and conveyed to a furnace 40. The furnace 40 may be selected from a rotary kiln, rotary hearth furnace, shaft furnace, fluidized bed or retort of various size and style employing either radiant heating, conductive heating or convective heating as well known in the art. The furnace 40 is heated to a desired temperature of between about 2100–2500° F. using most any form of fuel, e.g., solid, liquid or gaseous fuel of a type well known in the art. In a preferred embodiment, the compacts 24 are reduced in the furnace 40 for about 5–12 minutes at a temperature of about 2350–2500° F. Preferably, the green compacts 24 are uniformly distributed in the furnace.

Complete combustion occurs within the furnace 40 with a flue effluent temperature of about 2500° F. After a furnace temperature of about 2500° F. is obtained, only combustion air is introduced to the furnace 40 at a velocity low enough to achieve a slow rate of combustion which is unfavorable to the formation of nitrogen oxides. The combustion air is introduced to the furnace 40 to combust with the volatile matter contained in the compacts 24 and excess carbon monoxide to form carbon dioxide and to release heat for the reduction process sufficient to maintain a temperature of about 2100–2500° F. to allow effective recovery of impurities. At this temperature range, the carbon contained within the compacts 24 reacts with iron oxides forming elemental iron, carbon monoxide and carbon dioxide. In a preferred embodiment, the combustion air is enriched with oxygen and/or preheated to about 800° F. to improve the combustion process and reduction of iron-bearing material 12.

The carbon contained in the carbonaceous material 28 reacts with $Fe_2O_3$, $Fe_3O_4$, FeO and the like present in the compacts 24 forming the respective elemental metal and carbon monoxide. For example, for $Fe_2O_3$, $$9C+5Fe_2O_3 \rightleftharpoons 3CO+10Fe+6CO_2 \quad (1)$$

It has been found that the reduction of metal oxides, i.e., $Fe_2O_3$, $Fe_3O_4$, FeO and the like present in the compacts 24 is achieved at relatively low $CO/CO_2$ ratios of between about 2–5, and most preferably about 3. At a $CO/CO_2$ ratio of about 3 the furnace 40 temperature reaches about 2500° F. Previous investigations have indicated that $CO/CO_2$ ratios of more than 5 were required. Based upon an overall energy balance for the process, at a $CO/CO_2$ ratio of between about 2–5, the amount of carbon reductant in the compact 24 required in the process may be decreased thereby enabling the use of carbonaceous material 28 containing a higher volatile matter content without requiring excess energy or fuels to maintain the required furnace temperature. Any remaining hot carbon monoxide may react with any remaining unreacted iron oxide within the compacts 24 reducing the iron oxide and forming carbon dioxide. For example, for $Fe_2O_3$, $$3CO+Fe_2O_3 \rightleftharpoons 2Fe+3CO_2 \quad (2)$$

As shown in FIG. 1, the hot waste gas is exhausted from the furnace 40 through a combustion chamber 44 wherein excess carbon monoxide and volatile matter in the waste gas is oxidized with combustion air and oxygen to form carbon dioxide and water vapor. The hot waste gas is then routed to a heat exchanger 20 to preheat combustion air used in the furnace 40 and used to dry the iron-bearing material 12 and carbonaceous material 28 as previously described herein.

The waste gas is then further processed in a baghouse 46 of a type well known in the art wherein solid particulates are recovered. The solid particulates are removed and collected for disposal, recovery or reprocessing in accordance with the present invention. The waste gas from the baghouse 46 is then passed through a fan and stack to the atmosphere.

Figure 2:
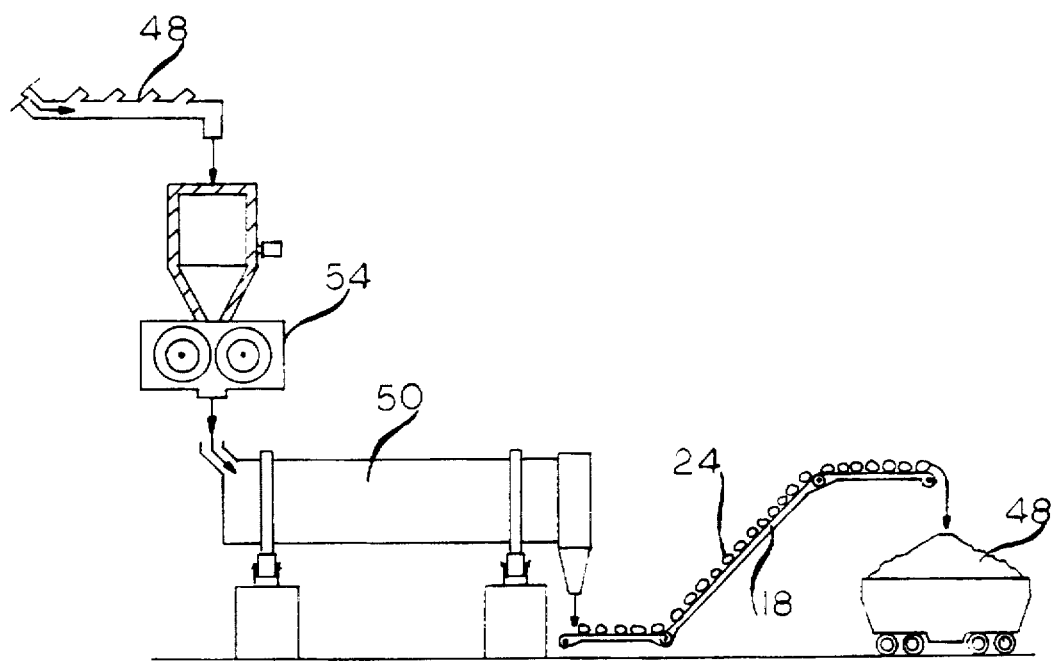
FIG. 2 is a partial schematic illustrating additional treatment of iron-bearing material by hot briquetting.
Figure 3:
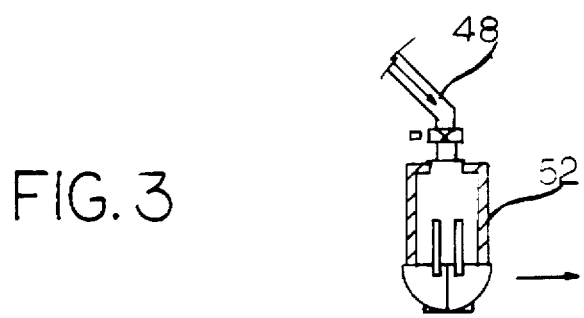
FIG. 3 is a partial schematic illustrating additional treatment of iron-bearing material to a hot charging bucket.
Figure 4:
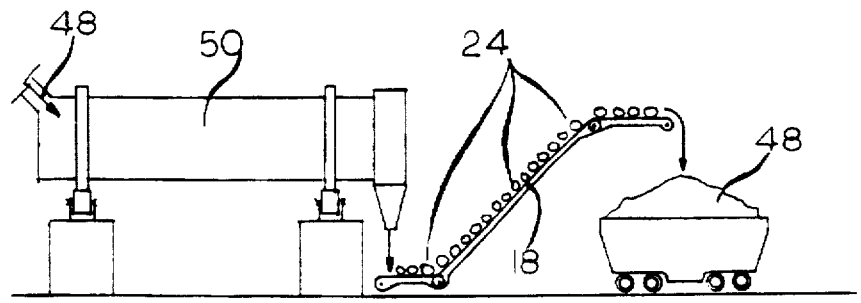
FIG. 4 is a partial schematic illustrating additional treatment of iron-bearing material.

As shown in FIGS. 2–4, the reduced compacts 48 are discharged from the furnace 40. The reduced compacts 48 may be discharged to a rotary cooler 50, insulated charging bucket 52 for direct transfer to an iron making process or to a hot compacting machine 54 followed by cooling to form hot briquetted iron compacts as well known in the art.

More particularly, the DRI compacts 48 may be discharged from the furnace 40 into an insulated charging bucket 52 and hot transferred to the steel making operation for subsequent use. The DRI compacts 48 may also be discharged directly into refractory lined, insulated and sealed containers of a type well known in the art.

The reduced compacts 48 are preferably discharged from the furnace 40 at a temperature of about 2350° F. The reduced iron remains in the compacts 48 throughout their passage through the furnace 40 along with normal non-reducing oxide materials in the iron-bearing material 12. The reduced compacts 48 contain all of the elemental iron units introduced with the iron-bearing material 12 and virtually all of the iron oxide is reduced to the elemental metal state.

As previously explained, a unique feature of the invention is that the DRI compacts 48 contain a significant amount of excess carbon as they are discharged from the furnace 40. The excess carbon in the compacts may be adjusted from about 2–10 wt %. The excess carbon acts as a reductant to reduce the metal oxide to free metal, i.e., iron oxide to elemental iron, and acts to protect the elemental iron from re-oxidation. It will be appreciated that carbon dioxide and water vapor are present in the furnace atmosphere in part from reactions occurring in the compacts as they are heated and in part from the combustion of fuels in the furnace. Both carbon dioxide and water vapor present in the furnace atmosphere are capable of oxidizing the elemental iron back to iron oxide.

$$Fe+CO_2 \rightleftharpoons FeO+CO \quad (3)$$

$$Fe+H_2O \rightleftharpoons FeO+H_2 \quad (4)$$

Within the above provided iron ore reduction process operating temperature range (2100°–2500° F.), the $CO/CO_2$ ratio for equation (3) at equilibrium is between about 2.9–3.5. This means that if the ratio is less than this range then oxidation of the elemental iron will occur. Likewise, the $H_2/H_2O$ ratio at equilibrium is between about 1.2–1.4 (equation (4)). Again, if the $H_2/H_2O$ ratio is less than this then water vapor will oxidize elemental iron.

However, the excess carbon in the compact is capable of reacting with carbon dioxide according to the Boudouard reaction, equation (5):

$$C+CO_2 \rightleftharpoons 2CO \quad (5)$$

and with water vapor according to the water gas reaction, equation (6):

$$C+H_2O \rightleftharpoons CO+H_2 \quad (6)$$

to produce CO and $H_2$, respectively. Within the operating temperature range specified, the equilibrium $CO/CO_2$ ratio produced by equation (5) is from about 24–58. Likewise, the equilibrium $H_2/H_2O$ ratio from equation (6) is from about 133–570. The excess carbon competes with free iron for $CO_2$ and $H_2O$, reducing the concentrations of these two oxidizing gases and increasing the concentration of the reducing gases CO and $H_2$ thus increasing the $CO/CO_2$ and $H_2/H_2O$ ratios in and immediately around the reduced compacts. The CO and $H_2$ produced from the carbon reactions then re-reduces any oxidized iron back to free iron. Because of these protecting reactions, one is able to achieve high levels of metallization in the DRI product in spite of the oxidizing nature of the furnace atmosphere due to the presence of low $CO/CO_2$ and $H_2/H_2O$ ratios.

The documents, patents and patent applications referred to herein are hereby incorporated by reference.

Having described presently preferred embodiments of the invention, it is to be understood that it may be otherwise embodied within the scope of the appended claims.

What is claimed is:

1. A process for treating iron-bearing material selected from the group consisting of virgin iron oxide concentrates and natural iron ore fines containing iron oxide and mixtures thereof to reduce the iron oxide to elemental iron, the process comprising the steps of:
   a) providing iron-bearing material and carbonaceous material containing less than about 8 wt % moisture;
   b) combining the iron-bearing material with the carbonaceous material to form a dry mixture, wherein the amount of carbonaceous material added exceeds the stoichiometric amount required to reduce the iron oxide to elemental iron;
   c) agglomerating the dry mixture to bond the dry mixture and form green compacts;
   d) loading the green compacts into a heated furnace;
   e) heating the green compacts for about 5–25 minutes at a temperature of between about 2100°–2500° F. to reduce the iron oxide containing compacts to compacts containing elemental iron and an excess amount of carbonaceous material wherein the excess amount of carbonaceous material counteracts re-oxidation of the elemental iron; and
   f) discharging the reduced iron-bearing compacts from the furnace.

2. The process of claim 1 wherein the iron-bearing material is of a size up to about minus 60 mesh.

3. The process of claim 1 wherein the iron-bearing material is of a size up to about minus 20 mesh.

4. The process of claim 1 wherein the iron-bearing material and the carbonaceous material contains less than about 3 wt % moisture.

5. The process of claim 1 wherein the green compacts are heated for about 5–12 minutes.

6. The process of claim 1 wherein the carbonaceous material contains at least about 20 wt % volatile matter, said agglomerating step performed under conditions sufficient to mobilize volatile matter from the excess amount of carbonaceous material to bond the dry mixture and form green compacts.

7. The process of claim 1 wherein the carbonaceous material contains between about 20–30 wt % volatile matter.

8. The process of claim 1 wherein the carbonaceous material is preheated to a temperature of about 150°–450° F.

9. The process of claim 1 wherein the dry mixture is agglomerated at a pressure greater than about 10,000 pounds per square inch.

10. The process of claim 1 wherein the dry mixture is agglomerated at a pressure greater than about 10,000 pounds per square inch and a temperature greater than about 400° F.

11. The process of claim 1 wherein oxygen is introduced to the furnace at a velocity low enough to achieve a slow rate of combustion unfavorable to the formation of nitrogen oxides.

12. The process of claim 1 wherein oxygen is mixed with the combustion air to the furnace.

13. The process of claim 1 wherein the iron-bearing material are preheated to about 500°–700° F.

14. The process of claim 1 wherein hot waste gas leaves the furnace and is routed to a combustion chamber wherein excess carbon monoxide and volatile matter are oxidized.

15. The process of claim 1 wherein the compacts are discharged to a soaking pit at a temperature sufficient to complete the reduction of the iron oxide to elemental iron.

16. The process of claim 1 further comprising the step of cooling the reduced compacts in an inert atmosphere.

17. The process of claim 1 further comprising the step of transporting the reduced compacts at an elevated temperature to the steel making operation.

18. The process of claim 1 further comprising the step of transporting the reduced compacts to a hot compacting machine to form hot briquetted iron compacts.

19. The process of claim 1 further comprising the step of blending an organic binder with the dry mixture.

20. The process of claim 1 further comprising the step of blending lime with the dry mixture.

21. A process for treating iron-bearing material including virgin iron oxide concentrates and natural iron-bearing ores to reduce the oxides to elemental iron, the process comprising the steps of:
   a) providing iron-bearing material and carbonaceous containing less than about 3 wt % moisture;
   b) combining the iron-bearing material with the carbonaceous material to form a dry mixture, wherein the amount of carbonaceous material added exceeds the stoichiometric amount;
   c) agglomerating the dry mixture to bond the dry mixture and form green compacts;
   d) loading the green compacts into a heated furnace;
   e) heating the green compacts for about 5–12 minutes at a temperature of between about 2100°–2500° F. to reduce the iron oxide containing compacts to compacts containing elemental iron and an excess amount of carbonaceous material wherein the excess amount of carbonaceous material counteracts re-oxidation of the elemental iron; and
   f) discharging the reduced iron-bearing compacts from the furnace.

22. The process of claim 21 wherein the carbonaceous material contains at least about 20 wt % volatile matter, said agglomerating step performed under conditions sufficient to mobilize volatile matter from the excess amount of carbonaceous material to bond the dry mixture and form green compacts.

23. The process of claim 21 further comprising the step of blending an organic binder with the dry mixture.

24. A process for treating iron-bearing material selected from the group consisting of virgin iron oxide concentrates and natural iron ore fines containing iron oxide and mixtures thereof to reduce the iron oxide to elemental iron, the process comprising the steps of:
   a) drying iron-bearing material and carbonaceous material;
   b) combining the iron-bearing material with the carbonaceous material to form a dry mixture without the addition of water and containing less than about 2 wt % water, wherein the amount of carbonaceous material added exceeds the stoichiometric amount required to reduce the iron oxide to elemental iron;

c) agglomerating the dry mixture to bond the dry mixture and form green compacts;

d) loading the green compacts into a heated furnace;

e) heating the green compacts to reduce the iron oxide containing compacts to compacts containing elemental iron and an excess amount of carbonaceous material wherein the excess amount of carbonaceous material counteracts re-oxidation of the elemental iron; and f) discharging the reduced iron-bearing compacts from the furnace.

25. The process of claim 24 wherein the carbonaceous material contains at least about 20 wt % volatile matter, said agglomerating step performed under conditions sufficient to mobilize volatile matter from the excess amount of carbonaceous material to bond the dry mixture and form green compacts.

26. The process of claim 24 further comprising the step of blending an organic binder with the dry mixture.

* * * * *